United States Patent

McSweeney et al.

Patent Number: 4,459,364
Date of Patent: Jul. 10, 1984

[54] LOW-FIRE CERAMIC DIELECTRIC COMPOSITIONS

[75] Inventors: Robert T. McSweeney; Stanley A. Long, both of Valencia, Calif.

[73] Assignee: North American Philips Corporation, New York, N.Y.

[21] Appl. No.: 417,258

[22] Filed: Sep. 13, 1982

[51] Int. Cl.$^3$ ............................................. C04B 35/46
[52] U.S. Cl. .................................... 501/137; 501/138; 501/139
[58] Field of Search ..................... 501/137, 138, 139

[56] References Cited

U.S. PATENT DOCUMENTS

| | | | |
|---|---|---|---|
| 2,992,929 | 7/1961 | Clement et al. | 501/137 |
| 3,268,783 | 8/1966 | Saburi | 501/139 |
| 3,529,978 | 9/1970 | Taylor et al. | 501/138 |
| 4,135,224 | 1/1979 | Maher | 361/321 |
| 4,283,753 | 8/1981 | Burn | 361/321 |

FOREIGN PATENT DOCUMENTS

| | | | |
|---|---|---|---|
| 10479 | 4/1980 | European Pat. Off. | 501/137 |
| 51-76599 | 1/1976 | Japan | 501/139 |
| 52-10599 | 1/1977 | Japan | 501/138 |
| 429472 | 5/1974 | U.S.S.R. | 501/137 |

OTHER PUBLICATIONS

M. Hansen, *Constitution of Binary Alloys*, pp. 41 and 42, McGraw-Hill (1958).
R. B. Amin et al., *Abstract Precious Metal Electrode Systems for Multilayer Ceramic Capacitors*, Nat'l Materials Adv. Bd. Workshops on Reliability of Multilayer Capacitors, (Mar. 1982).

*Primary Examiner*—Helen M. McCarthy
*Attorney, Agent, or Firm*—Marc D. Schechter

[57] ABSTRACT

A low-fired ceramic dielectric composition, a multilayer capacitor made from such a ceramic dielectric composition provided with silver/palladium electrodes having at least 65 atomic percent silver, and a method of manufacturing such a multilayer capacitor. The ceramic is barium titanate-based and includes $Bi_2O_3$, $Nb_2O_5$, and $TiO_2$ to improve sinterability. $MnCO_3$ is added to increase the insulation resistance. The multilayer capacitor includes high silver-content electrodes to reduce the quantity of expensive noble metals. The multilayer part may be fired at a temperature of 1150° C. or less to yield a capacitor meeting EIA specification X7R. The low firing temperature also inhibits a chemical reaction between bismuth and palladium.

3 Claims, 1 Drawing Figure

LOW-FIRE CERAMIC DIELECTRIC COMPOSITIONS

BACKGROUND OF THE INVENTION

The invention relates to ceramic dielectric materials which can be fired at relatively low temperatures. The invention also relates to multilayer capacitors utilizing such dielectric materials in layers separated by electrodes. The electrodes are made of alloys which remain solid at the firing temperature and which remain substantially metallic (nonoxidized) throughout firing. Moreover, the invention relates to a method of manufacturing such dielectric materials and multilayer capacitors.

In the past, ceramic capacitors have been made in various forms. These forms include disc capacitors and multilayer capacitors. In disc capacitors, preparation and firing of the ceramic dielectric precedes and is separate from the step of applying the electrodes to the dense ceramic dielectric. In contrast, in the production of multilayer capacitors the electrodes are applied to a green ceramic, after which the entire ceramic/electrode combination is fired. Thus, multilayer capacitors impose additional constraints on capacitor production. In multilayer capacitors the electrodes must be able to withstand firing (i) without reacting with the ceramic, (ii) without reacting with the firing atmosphere, and (iii) without melting.

For example, a general purpose ceramic dielectric composition is disclosed in U.S. Pat. No. 3,529,978. This composition is made up essentially of $BaTiO_3$ with $Bi_2O_3$, $Nb_2O_5$, $TiO_2$, and ZnO or MgO. The resulting compositions have dielectric constants generally above 1000 at room temperature, and the temperature coefficient of capacitance is relatively small. The ceramic is fired in a temperature range of 2140°–2340° F. (1170°–1280° C.) depending upon the particular composition used.

While this material alone has good dielectric properties, an attempt to use it in multilayer capacitors may lead to problems. The high firing temperature required to process this material (1170°–1280° C.) necessitates the use of expensive noble metal electrodes which can withstand the high sintering temperatures without melting and without oxidizing. For example, the electrodes may be made of gold, platinum, or palladium. Moreover, in the case of palladium electrodes, the palladium tends to chemically react with the bismuth in the ceramic to produce microcracks and/or voids in the ceramic and to produce discontinuous electrodes. These defects reduce the reliability, insulation resistance, and breakdown voltage of the capacitors. They also increase the dissipation factor of the capacitors, and reduce the lifetime of the capacitors. (Abstract: *Precious Metal Electrode Systems for Multilayer Ceramic Capacitors*, R. B. Amin et al, National Materials Advisory Board Workshop on Reliability of Multilayer Ceramic Capacitors, March 1982.)

Besides gold, platinum, and palladium, silver electrodes are known to be resistant to oxidation during firing. However, pure silver melts at about 960° C., which is well below the range of firing temperatures used in U.S. Pat. No. 3,529,978.

One possible way of overcoming the problems of the high cost of noble metal electrodes, the bismuth-palladium reaction, and the low melting temperature of silver is by using, for example, silver-palladium alloy electrodes. The bismuth-palladium reaction is reportedly suppressed when the palladium content of such electrodes is less than thirty-five atomic percent (see, Amin et al, supra). Moreover, silver-palladium alloys having less than thirty-five atomic percent palladium are less expensive than either pure palladium or alloys having a higher palladium content. However, because silver-palladium alloys having no more than thirty-five atomic percent palladium melt at temperatures below approximately 1190° C. (see, *Constitution of Binary Alloys*, M. Hansen, pages 41 and 42, McGraw Hill, 1958), it is necessary to fire multilayer capacitors using such electrodes at temperatures of approximately 1150° C. or less. (This spread betwen the melting temperature and the firing temperature is provided for two reasons. First, it is provided so that inherent variations in the temperature in the furnace will not allow the "spot" temperature to rise above 1190° C. Second, it is provided to allow for a lowering of the melting temperature of the electrodes due to a diffusion of bismuth into the electrodes from the ceramic.)

Although from the above discussion it appears that good, inexpensive electrodes can be formulated, the ceramic disclosed in U.S. Pat. No. 3,529,978 must be fired at a temperature between 1170°–1280° C. This firing temperature range is too high for use of the proposed silver-palladium electrodes in a multilayer capacitor. At these temperatures, the electrodes will melt and thereby render the resulting product useless as a multilayer capacitor. Moreover there is evidence (e.g. Amin et al, supra) that there may be a destructive bismuth-palladium reaction producing further harm to the electrodes at these firing temperatures.

SUMMARY OF THE INVENTION

It is an object of the invention to provide a ceramic dielectric composition which can be fired into a dense body at a temperature at or below 1150° C.

It is another object of the invention to provide a ceramic dielectric composition which contains bismuth and which can be fired with relatively inexpensive silver-palladium electrodes having less than thirty-five atomic percent palladium, without experiencing an excessvie reaction between the bismuth in the ceramic and palladium in the electrode.

It is a further object of the invention to provide a ceramic dielectric composition which can meet or exceed EIA specification X7R, which requires that the dielectric have (1) a change (positive or negative) in capacitance over the operating temperature range of −55° C. to +125° C. relative to the capacitance at room temperature of less than 15%, (2) a dissipation factor less than 2.5% over the entire operating temperature range, (3) a room temperature RC product of greater than 1000 seconds, and (4) an RC product of greater than 100 seconds at 125° C.

It is yet another object of the invention to provide a ceramic dielectric composition which has a dielectric constant at 25° C. of at least 800, preferably between 800 and 1800.

It is still another object of the invention to provide a multilayer capacitor which can be fired below 1150° C. and still meet the EIA specification X7R described above.

It is yet another object of the invention to provide a method of manufacturing a multilayer capacitor meeting EIA specification X7R by firing the ceramic/electrode combination at a temperature below 1150° C.

It is a further object of the invention to provide a method of manufacturing a multilayer capacitor having a bismuth-containing dielectric and silver-palladium electrodes, in which the electrodes are not destroyed by a bismuth-palladium reaction during firing.

According to the invention, a ceramic dielectric composition consists essentially of a reacted mixture of 83 to 91 weight percent $BaTiO_3$, 8 to 13 weight percent $Bi_2O_3$, up to 4 weight percent $Nb_2O_5$, 0 to 1.8 weight percent $TiO_2$ or $SnO_2$, and 0.04 to 0.18 weight percent $MnCO_3$. In a preferred aspect of the invention, the ceramic dielectric composition consists essentially of 88.8 weight percent $BaTiO_3$, 8.4 weight percent $Bi_2O_3$, 1.6 weight percent $Nb_2O_5$, 1.0 weight percent $TiO_2$, and 0.17 weight percent $MnCO_3$.

According to another aspect of the invention, the ceramic composition further includes up to 1.8 weight percent PbO.

A multilayer capacitor according to the invention includes at least two layers of a ceramic dielectric composition separated by an electrode layer. The ceramic dielectric composition consists essentially of the reacted mixture described above. The electrode layer consists essentially of a mixture of at least 65 weight percent silver and not more than 35 weight percent palladium.

A method of manufacturing a multilayer capacitor according to the invention includes the steps of forming a stack of layers of a ceramic dielectric composition separated by layers of an electrode, and firing the ceramic and electrode layers in air at a temperature of 1150° C. or less. The ceramic dielectric composition consists essentially of the prereacted mixture described above, and the electrode layer consists essentially of 65 weight percent silver and not more than 35 weight percent palladium. Preferably, the ceramic and electrode layers are fired at a temperature in the range of 1070°–1150° C.

The ceramic dielectric composition, multilayer capacitor made therefrom, and method of manufacture according to the invention are advantageous because the resulting multilayer capacitor meets EIA specification X7R. Moreover, the multilayer capacitor can be produced by sintering at a relatively low firing temperature, which means that the process consumes less fuel, the capacitors can utilize less expensive silver-palladium alloy electrodes, and there will be no excessive bismuth-palladium reaction to reduce the yield of acceptable products below an economical level.

DESCRIPTION OF THE PREFERRED EMBODIMENTS

Figure 1:
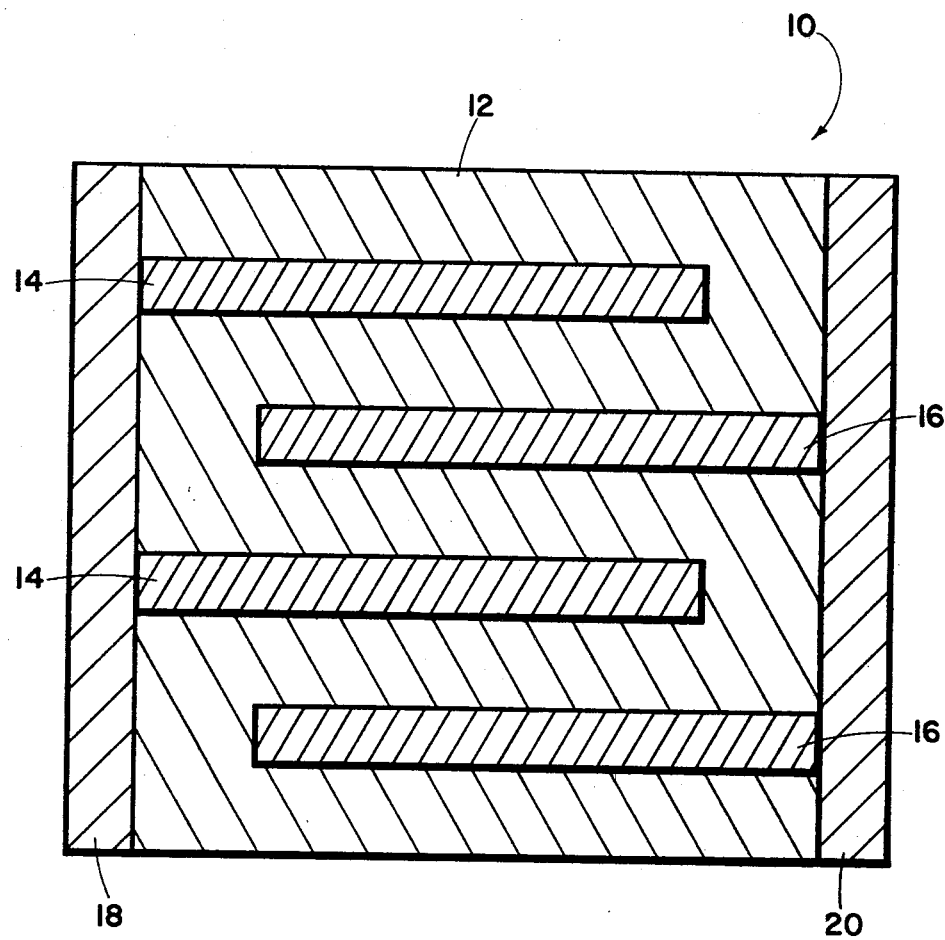
FIG. 1 is a cross-sectional view of a multilayer capacitor according to the invention.

FIG. 1 shows a cross-sectional view of a multilayer capacitor 10 according to the invention. Multilayer capacitor 10 is made up of several ceramic dielectric layers 12. The ceramic dielectric layers 12 are separated by electrodes 14 and 16. Alternate electrodes 14 are connected to a single termination 18 on one end of the capacitor. The remaining alternate electrodes 16 are connected to termination 20 on the other end of the capacitor. In this way, the opposite sides of each ceramic dielectric layer 12 are electrically connected to terminations 18 and 20. The structure thus produces a stack of ceramic capacitors which are electrically connected in parallel.

A multilayer capacitor 10 can be manufactured in the following manner. First $BaTiO_3$ (or its precursors) plus the various modifier compounds according to the invention are either wet or dry mixed. Next, the mixture is preferably prereacted. While prereaction is not necessary, it produces a better distribution of the various constituents. In all of the examples, below, the constituents were prereacted for 16 hours at 900° C. ±50° C.

After completion of the initial firing, the prereacted ceramic is then preferably ball milled for 10–24 hours to produce a fine powder. The resulting powder is then mixed with any conventional organic binder to produce a slurry. The slurry is tape cast using known techniques.

After the tape cast slurry has been dried, it is screen printed with an electrode pattern. Except where indicated otherwise, in all of the examples below the electrode consisted of a mixture of 70 weight percent silver and 30 weight percent palladium in an organic binder. After the electrode has been dried, tapes are stacked, pressed and diced to produce a multilayer structure. This structure is fired in air to increase the density of the ceramic. In the following examples, the green ceramics were fired at temperatures below 1150° C. for 1 to 2½ hours at the desired temperature.

EXAMPLES

Tables I and II show a series of experiments which were designed to determine the influences of ZnO, $Nb_2O_5$ and $TiO_2$ in conjunction with $Bi_2O_3$ on the sintering behavior and dielectric properties in modified $BaTiO_3$ ceramics. All of these compositions were made with ten electrode layers, each consisting of 70 weight percent silver and 30 weight percent palladium. The multilayer structures were fired at 1115° C. to 1120° C. for two hours in air.

TABLE I

| Comp. | $Bi_2O_3/Nb_2O_5/ZnO$ Modified $BaTiO_3$ (weight percent) | | | | | |
| --- | --- | --- | --- | --- | --- | --- |
|  | T11 | T12 | T13 | T14 | T15 | T16 |
| $BaTiO_3$ | 87.3 | 85.8 | 87.9 | 86.4 | 88.4 | 87.0 |
| $Bi_2O_3$ | 8.3 | 8.2 | 8.3 | 8.2 | 8.4 | 8.3 |
| $Nb_2O_5$ | 3.1 | 4.6 | 3.1 | 4.7 | 3.2 | 4.7 |
| $TiO_2$ | — | — | — | — | — | — |
| ZnO | 1.3 | 1.4 | 0.7 | 0.7 | 0.0 | 0.0 |
| $K_F$ | 670. | 670. | 1160. | 970. | 1230. | 1040. |
| D (%) | 1.10 | 0.90 | 1.10 | 1.10 | 0.60 | 0.80 |
| RC (25° C.) (Sec.) | 1900. | 3750. | 930. | 1000. | 250. | 440. |
| RC (125° C.) (Sec.) | 6. | 14. | 1. | 3. | 0.2 | 0.8 |

TABLE I-continued

| | Bi$_2$O$_3$/Nb$_2$O$_5$/ZnO Modified BaTiO$_3$ (weight percent) | | | | | |
|---|---|---|---|---|---|---|
| Comp. | T11 | T12 | T13 | T14 | T15 | T16 |
| ΔC$_T$(%) (−55° C.) | −8. | −5. | +1. | +1. | +11. | +9. |
| ΔC$_T$(%) (+125° C.) | +6. | −2. | −6. | −5. | −15. | −12. |

The data from Table I indicates that the temperature variation of the capacitance of each part, namely the temperature coefficient of capacitance (TCC), can be made relatively low. This is reflected in the relatively low percentage changes in capacitance, ΔC$_T$, at −55° C. and at +125° C. However, these materials also have low dielectric constants, K$_F$, and unacceptably low resistance-capacitance (RC) products. Increasing the Nb$_2$O$_5$ concentration at constant Bi$_2$O$_3$ and ZnO concentrations did not have very much affect on the dielectric properties, althought the lower Nb$_2$O$_5$ concentrations were associated with somewhat higher dielectric constants and slightly less refractory sintering behavior.

although the RC products and temperature coefficient of capacitance of the composition were unacceptable.

Table II provides data for compositions T17 through T22. This series was designed to mimic the trends defined by compositions T11 through T16, but with one half the Nb$_2$O$_5$ replaced by TiO$_2$. The data shown in Table II indicates that the TiO$_2$ substitution is effective in increasing the dielectric constant, raising the room temperature RC product, and in rotating the temperature characteristics (the change in capacitance verses temperature curve) in a counterclockwise direction. Unfortunately, these materials have inferior hot RC products and/or unacceptably large values of ΔC$_T$.

TABLE II

| | Bi$_2$O$_3$/Nb$_2$O$_5$/TiO$_2$/ZnO modified BaTiO$_3$ (weight percent) | | | | | | |
|---|---|---|---|---|---|---|---|
| Comp | T17 | T18 | T19 | T20 | T21 | T22 | T23 |
| BaTiO$_3$ | 87.8 | 86.6 | 88.4 | 87.2 | 89.0 | 87.9 | 91.3 |
| Bi$_2$O$_3$ | 8.3 | 8.2 | 8.4 | 8.3 | 8.4 | 8.3 | 8.7 |
| Nb$_2$O$_5$ | 1.6 | 2.3 | 1.6 | 2.3 | 1.6 | 2.4 | 0.0 |
| TiO$_2$ | 0.9 | 1.4 | 0.9 | 1.4 | 0.9 | 1.4 | 0.0 |
| ZnO | 1.4 | 1.4 | 0.7 | 0.7 | 0.00 | 0.00 | 0.00 |
| K$_F$ | 1560. | 1050. | 1550. | 1160. | 1630. | 1180. | (1370.)* |
| D (%) | 2.00 | 1.60 | 1.60 | 1.30 | 1.20 | 1.00 | (3.5)* |
| RC (Sec.) (25° C.) | 5300. | 3400. | 7200. | 7100. | 8500. | 1400. | 50. |
| RC (Sec.) (125° C.) | 1900. | 1700. | <10. | <10. | 20.2 | <1.8 | 50. |
| ΔC$_T$(%) (−55° C.) | −21. | −14. | −10. | −6. | +2. | +3. | −18. |
| ΔC$_T$(%) (+125° C.) | +15. | +8. | +4. | 0.0 | −7.0 | −7.0 | +54. |

*( ) Indicate wide spread in values.

The dissipation factor, D, of each composition was satisfactory.

In Table I and the other tables below, K$_F$ is the fired dielectric constant of each mutilayer capacitor. These figures have been approximated, based upon measurements of the unfired or green dielectric constant of each capacitor. The calculation of K$_F$ was based upon a 20% volume shrinkage on firing, and is accurate to within approximately ±15% of the calculated shrinkage (±3% of the total value of K$_F$).

Referring again to Table I, the reduction and elimination of ZnO in these formulations appeared to result in an increase in the dielectric constant and a clockwise rotation of the change in capacitance verses temperature curve. This latter effect is reflected in the increase in ΔC$_T$ at −55° C. and the decrease in ΔC$_T$ at +125° C. The presence of ZnO appeared to hinder the incorporation of Nb$_2$O$_5$ in the BaTiO$_3$ lattice. Consequently, the Curie peak moved to a lower temperature as ZnO was removed from the composition.

Moreover, microstructural examination of multilayer capacitors made from the compositions of Table I revealed the presence of a second phase which increases in concentration with increasing Nb$_2$O$_5$ concentration and which becomes more finely distributed with decreasing ZnO concentration. Advantageously, the second phase was almost eliminated in composition T15, Microstructural trends noted in composition T17 through T22 closely correspond to those observed in T11 through T16. Decreased and more finely distributed second phase concentrations were observed as ZnO concentrations were decreased.

Composition T23 (Table II) was prepared to determine whether modifiers other than Bi$_2$O$_3$ are needed to produce a low-firing composition with good dielectrical properties. The data shown in Tables I and II indicate that Nb$_2$O$_5$ or Nb$_2$O$_5$/TiO$_2$ additions are required to attain good sinterability. Without the addition of a source of small cations (ionic radii less than 0.85 angstroms), in the proportion of 50 to 100 mole % of the bismuth-ion concentration, observations revealed that the ceramic body becomes very porous and exhibits poor electrical properties upon firing at 1150° C. or below.

As described below, in order to satisfy this requirement for the addition of small cations, SnO$_2$ can be substituted for TiO$_2$. It has also been found that Ta$_2$O$_5$ can be substituted for Nb$_2$O$_5$. These substitutions, however, have been found to require somewhat higher sintering temperatures.

Compositions T24, T26 through T28, and T31 through T34 show the effect of MnCO$_3$ additions to the modified BaTiO$_3$. The make-up of these compositions and their resulting properties are shown in Tables III and IV. The compositions shown in Table III were fired at 1120° C. for 2 hours. The electrodes were 70% silver/30% palladium. The compositions shown in Table IV were fired at 1150° C. for 2 hours. The electrodes used were 60% silver and 40% palladium, because 70% silver and 30% palladium internal electrodes would not survive this higher firing temperature.

TABLE III $MnCO_3$ Influence on $Bi_2O_3/Nb_2O_5/ZnO$ Modified $BaTiO_3$
(weight percent)

| Comp | T24 | T26 | T31 | T32 |
|---|---|---|---|---|
| $BaTiO_3$ | 87.9 | 87.5 | 87.5 | 87.4 |
| $Bi_2O_3$ | 8.3 | 8.3 | 8.3 | 8.3 |
| $Nb_2O_5$ | 3.2 | 3.1 | 3.1 | 3.1 |
| $TiO_2$ | 0.00 | 0.0 | 0.0 | 0.0 |
| ZnO | 0.70 | 1.0 | 1.0 | 1.0 |
| $MnCO_3$ | 0.0 | 0.04 | 0.08 | 0.17 |
| $K_F$ | 1310.+ | 1140. | (800.)* | 1060. |
| D (%) | 1.0 | 1.3 | 1.3 | 1.3 |
| RC (25° C.) (Sec.) | 1400. | 28,000. | 14,400. | 22,000. |
| RC (125° C.) (Sec.) | <1. | 760. | 1,120. | 1,060. |
| $\Delta C_T$(%) (−55° C.) | +3.8 | −5.0 | −6.0 | −6.0 |
| $\Delta C_T$(%) (+125° C.) | −8. | 0.0 | +2.0 | +2.0 |

*Wide scatter in capacitance values - poor end termination electrode pickup.
+This value is too high, probably due to an inadequate tape thickness measurement.

The data shown in Table III indicate that $MnCO_3$ additions of from 0.04 weight percent to 0.18 weight percent are instrumental in increasing both the room temperature and the hot RC products to levels much in excess of the minimum requirements of X7R applications. However, $MnCO_3$ additions are not as effective at increasing the hot RC products in compositions having more $BaTiO_3$ and lower modifier contents. (Table IV) Also, where the modifier content is lowered, the $MnCO_3$ additions appear to cause the temperature characteristics of the capactiors to fall outside of the ±15% envelope, over the temperature range of −55° C. to +125° C., dictated by the X7R specification.

TABLE IV $MnCO_3$ Influence on $Bi_2O_3/Nb_2O_5/ZnO$ Modified $BaTiO_3$
Lower Modifier Loading
(weight percent)

| Comp | T27 | T28 | T33 | T34 |
|---|---|---|---|---|
| $BaTiO_3$ | 91.7 | 91.7 | 91.6 | 91.6 |
| $Bi_2O_3$ | 5.8 | 5.8 | 5.8 | 5.8 |
| $Nb_2O_5$ | 1.8 | 1.8 | 1.8 | 1.8 |
| $TiO_2$ | — | — | — | — |
| ZnO | 0.70 | 0.70 | 0.70 | 0.70 |
| $MnCO_3$ | 0.00 | 0.04 | 0.09 | 0.18 |
| $K_F$ | 1270. | 1270. | 1180. | 1120. |
| D (%) | 3.0 | 2.6 | 3.0 | 2.8 |
| RC (25° C.) (Sec.) | 25. | 2,350. | 2,260. | 1,300. |
| RC (125° C.) (Sec.) | 600. | 1,000. | 1,000. | 680. |
| $\Delta C_T$(%) (−55° C.) | −5. | −6. | −8. | −12. |
| $\Delta C_T$(%) (+125° C.) | +6. | +15. | +18. | +17. |

Table V shows electrical and compositional data for compositions T37 through T44. These compositions were fired between 1100° and 1105° C. for two hours, with 70% silver and 30% palladium internal electrodes. These compositions show that higher modifier content compositions can be used without any detrimental effects other than reducing the dielectric constant. These materials can be fired to full density at 1080° C.

TABLE V $Bi_2O_3/Nb_2O_5/TiO_2/ZnO$ Modified $BaTiO_3$/High Modifier Loading
(weight percent)

| Comp | T37 | T38 | T39 | T40 | T41 | T42 | T43 | T44 |
|---|---|---|---|---|---|---|---|---|
| $BaTiO_3$ | 84.1 | 84.6 | 85.2 | 85.8 | 83.4 | 84.4 | 85.0 | 85.6 |
| $Bi_2O_3$ | 10.7 | 10.1 | 10.1 | 10.2 | 12.0 | 11.1 | 11.1 | 11.2 |
| $Nb_2O_5$ | 4.0 | 3.8 | 3.8 | 3.8 | 3.7 | 1.9 | 1.9 | 1.9 |
| $TiO_2$ | 0.0 | 0.0 | 0.0 | 0.0 | 0.0 | 1.1 | 1.1 | 1.1 |
| ZnO | 1.0 | 1.3 | 0.7 | 0.0 | 0.7 | 1.3 | 0.7 | 0.0 |
| $MnCO_3$ | 0.10 | 0.16 | 0.16 | 0.16 | 0.16 | 0.16 | 0.16 | 0.16 |
| $K_F$ | 990. | 1070. | 1090. | 970. | 950. | 1235. | 1520. | 1480. |
| D (%) | 1.0 | 1.4 | 1.2 | 0.9 | 1.4 | 1.6 | 1.4 | 1.2 |
| RC (Sec) (25° C.) | 18,000 | 21,000 | 29,000 | 37,000 | >10,000 | >10,000 | 17,000 | 15,000 |
| RC (Sec) (125° C.) | 365. | 690. | 415. | 200. | 340. | 920. | 850. | 1000. |
| $\Delta C_T$(%) (−55° C.) | +2. | −7. | −1.0 | +4. | −1. | −10. | −6. | −3. |
| $\Delta C_T$(%) (+125° C.) | −6. | +4. | −3.0 | −8. | −5. | +5. | −2. | −4. |

Compositions T37, T41, T44, and T54 shown in Table VI were fired between 1070° and 1085° C. The internal electrodes were 80% silver and 20% palladium. These materials were fired to full density in this temperature range without damaging the high silver-content electrodes. All of these capacitors exceeded the X7R specification.

TABLE VI $Bi_2O_3/Nb_2O_5/ZnO/PbO$ Modified $BaTiO_3$
Higher Modifier Loading and Lower Firing Temperatures
(weight percent)

| Comp | | T37 | T41 | T44 | T54 |
|---|---|---|---|---|---|
| $BaTiO_3$ | | 84.1 | 83.4 | 85.6 | 86.7 |
| $Bi_2O_3$ | | 10.7 | 12.0 | 11.2 | 8.2 |
| $Nb_2O_5$ | | 4.0 | 3.8 | 1.9 | 3.1 |
| $TiO_2$ | | 0.0 | 0.0 | 1.1 | 0.0 |
| ZnO | | 1.0 | 0.7 | 0.0 | 0.0 |
| PbO | | 0.0 | 0.0 | 0.0 | 1.8 |
| $MnCO_3$ | | 0.10 | 0.16 | 0.16 | 0.17 |
| | $T_F$ | | | | |
| $K_F$ | 1070° C. | 990. | 880. | 1360. | 1375. |
| | 1085° C. | 960. | 880. | 1390. | 1350. |
| D (%) | 1070° C. | 0.9 | 0.9 | 1.3 | 1.6 |
| | 1085° C. | 0.9 | 0.8 | 1.1 | 1.5 |

TABLE VI-continued

Bi$_2$O$_3$/Nb$_2$O$_5$/ZnO/PbO Modified BaTiO$_3$
Higher Modifier Loading and Lower Firing Temperatures
(weight percent)

| Comp | | T37 | T41 | T44 | T54 |
|---|---|---|---|---|---|
| RC$_{25}$ | 1070° C. | 60,000. | 60,000. | 60,000. | 45,000. |
|  | 1085° C. | 20,000. | 45,000. | 40,000. | 30,000. |
| RC$_{125}$ | 1070° C. | 650. | 2,700. | 2,000. | 1,500. |
|  | 1085° C. | 680. | 880. | 1,300. | 1,000. |
| Δ C (−55) | 1070° C. | −3.5 | −2.0 | −5.0 | −4.5 |
|  | 1085° C. | −1.5 | +1.0 | −3.0 | −1.5 |
| Δ C (−125 or 85° C.) | 1070° C. | −2.0 | −4.0 | −2. | +10. |
|  | 1085° C. | −3.0 | −5.0 | −4. | +5. |

Table VII includes compositions T46, T47, T49, T50, and T53 through T56. All of these compositions were fired at 1105° C. for two hours with 70% silver and 30% palladium electrodes. The preferred composition, T50, does not contain any ZnO and has half the Nb$_2$O$_5$ replaced with TiO$_2$. MnCO$_3$ is present as a dopant. Comparison with T49 shows that the addition of ZnO serves only to increase the temperature variation of capacitance. Improved temperature characteristics are observed in compositions T53 and T54 where ZnO is replaced with PbO. However, these latter materials have lower dielectric constants than does T50.

TABLE VII

Effect of TiO$_2$ or SnO$_2$ Substitution for Nb$_2$O$_5$
Effect of PbO Substitition for ZnO
Effect of ZnO Elimination
(weight percent)

| Comp | T46 | T47 | T49 | T50 | T53 | T54 | T55 | T56 |
|---|---|---|---|---|---|---|---|---|
| BaTiO$_3$ | 87.7 | 88.3 | 88.2 | 88.8 | 87.2 | 86.7 | 87.9 | 87.5 |
| Bi$_2$O$_3$ | 8.3 | 8.4 | 8.4 | 8.4 | 8.3 | 8.2 | 8.3 | 8.3 |
| Nb$_2$O$_5$ | 3.1 | 3.1 | 1.6 | 1.6 | 3.1 | .3.1 | 1.6 | 1.6 |
| TiO$_2$ | 0.0 | 0.0 | 0.9 | 1.0 | 0.0 | 0.0 | 0.5 | 0.0 |
| SnO$_2$ | 0.0 | 0.0 | 0.0 | 0.0 | 0.0 | 0.0 | 0.9 | 1.8 |
| ZnO | 0.7 | 0.0 | 0.7 | 0.0 | 0.3 | 0.0 | 0.7 | 0.7 |
| PbO | 0.0 | 0.0 | 0.0 | 0.0 | 0.9 | 1.8 | 0.0 | 0.0 |
| MnCO$_3$ | 0.17 | 0.17 | 0.17 | 0.17 | 0.17 | 0.17 | 0.17 | 0.17 |
| K$_F$ | 1200. | 1230. | 1710. | 1690. | 1320. | 1400. | 1470. | 1330. |
| D (%) | 1.4 | 1.1 | 2.2 | 1.5 | 1.2 | 1.3 | 2.0 | 1.8 |
| RC (Sec) (25° C.) | 19,000 | 15,000 | 13,000 | 40,000 | 35,000 | 20,000 | 20,000 | 8,000 |
| RC (Sec) (125° C.) | 900. | 1000. | 600. | 700. | 600. | 3000. | 1500. | 1500 |
| Δ C$_T$(%) (−55° C.) | −2.5 | +5.0 | −12.0 | −5.0 | +3. | +2. | −11. | −10. |
| Δ C$_T$(%) (+125° C.) | +2.5 | −6.0 | +18.0 | +4.0 | −4. | −2. | +14. | +12. |

A series of observational experiments were performed on test multilayer capacitors to determine the conditions under which the elecrodes were damaged due to the reported bismuth-palladium reaction. The ceramic dielectric compositions included quantities of Bi$_2$O$_3$ ranging from 5.8 weight percent to 13 weight percent. These compositions were used to make multilayer capacitors having silver-palladium electrodes ranging from 40% palladium to 75% palladium. Finally, the multilayer capacitors were fired at temperatures from 1100° C. to 1250° C.

From these experiments, the following qualitative conclusions were drawn. First, the magnitude of the bismuth-palladium reaction appears to be related not so much to the palladium content of the electrodes but more importantly to the temperature at which the multilayer capacitor is fired. By lowering the firing temperature the magnitude of the reaction is lessened.

Moreover, it appears that the bismuth-palladium reaction can be suppressed by compensating the bismuth-ions with small (ionic radii less than 0.85 angstroms) cations such as niobium and titanium in the ceramic. Higher uncompensated Bi$_2$O$_3$ contents appeared to promote the bismuth-palladium reaction and the consequent destruction of the internal electrodes.

What is claimed is:

1. A low-fire dielectric composition which meets or exceeds EIA specification X7R consisting essentially of a reacted mixture of:
   83 to 91 weight percent BaTiO$_3$;
   8 to 13 weight percent Bi$_2$O$_3$;
   up to 4 weight percent Nb$_2$O$_5$;
   0 to 1.8 weight percent TiO$_2$ or SnO$_2$; and
   0.04 to 0.18 weight percent MnCO$_3$.

2. A ceramic dielectric composition as claimed in claim 1, which consists essentially of a reacted mixture of:
   approximately 88.8 weight percent BaTiO$_3$;
   approximately 8.4 weight percent Bi$_2$O$_3$;
   approximately 1.6 weight percent Nb$_2$O$_5$;
   approximately 1.0 weight percent TiO$_2$; and
   approximately 0.17 weight percent MnCO$_3$.

3. A ceramic dielectric composition as claimed in claim 1 which further includes up to 1.8 weight percent PbO.

* * * * *